(12) United States Patent
Seol

(10) Patent No.: US 7,486,620 B2
(45) Date of Patent: Feb. 3, 2009

(54) REVERSE LINK DATA RATE CONTROL METHOD IN MOBILE COMMUNICATION SYSTEM

(75) Inventor: Jee Woong Seol, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 865 days.

(21) Appl. No.: 10/929,415

(22) Filed: Aug. 31, 2004

(65) Prior Publication Data

US 2005/0047344 A1 Mar. 3, 2005

(30) Foreign Application Priority Data

Sep. 1, 2003 (KR) .................... 10-2003-0060714

(51) Int. Cl.
*H04J 1/16* (2006.01)
(52) U.S. Cl. ..................................... 370/235
(58) Field of Classification Search ............. 370/235, 370/229, 230, 329, 282, 253, 320, 317, 318, 370/252, 322, 331, 332, 342, 441, 458, 491, 370/395.4; 455/500, 507, 127.2
See application file for complete search history.

(56) References Cited

U.S. PATENT DOCUMENTS 7,139,274 B2 * 11/2006 Attar et al. ............... 370/395.4
7,155,236 B2 * 12/2006 Chen et al. ................. 455/454

* cited by examiner

*Primary Examiner*—Chi H Pham
*Assistant Examiner*—Alexander Boakye
(74) *Attorney, Agent, or Firm*—Ked & Associates, LLP

(57) ABSTRACT

A method of controlling a reverse link data rate, A method of controlling reverse link data rate in a mobile communication system supporting hybrid automatic retransmission request (HARQ) transmission is provided, by which a single grant message is transmitted via a forward grant channel to control a reverse link data rate of a plurality of subchannels of a reverse packet data channel. The method includes steps of generating rate control information for determining a data rate for transmission by a mobile station via a reverse traffic channel; and transmitting to the mobile station a message including the generated rate control information and subchannel information, the message corresponding to a series of subchannel transmissions to which the determined data rate will be applied.

14 Claims, 9 Drawing Sheets

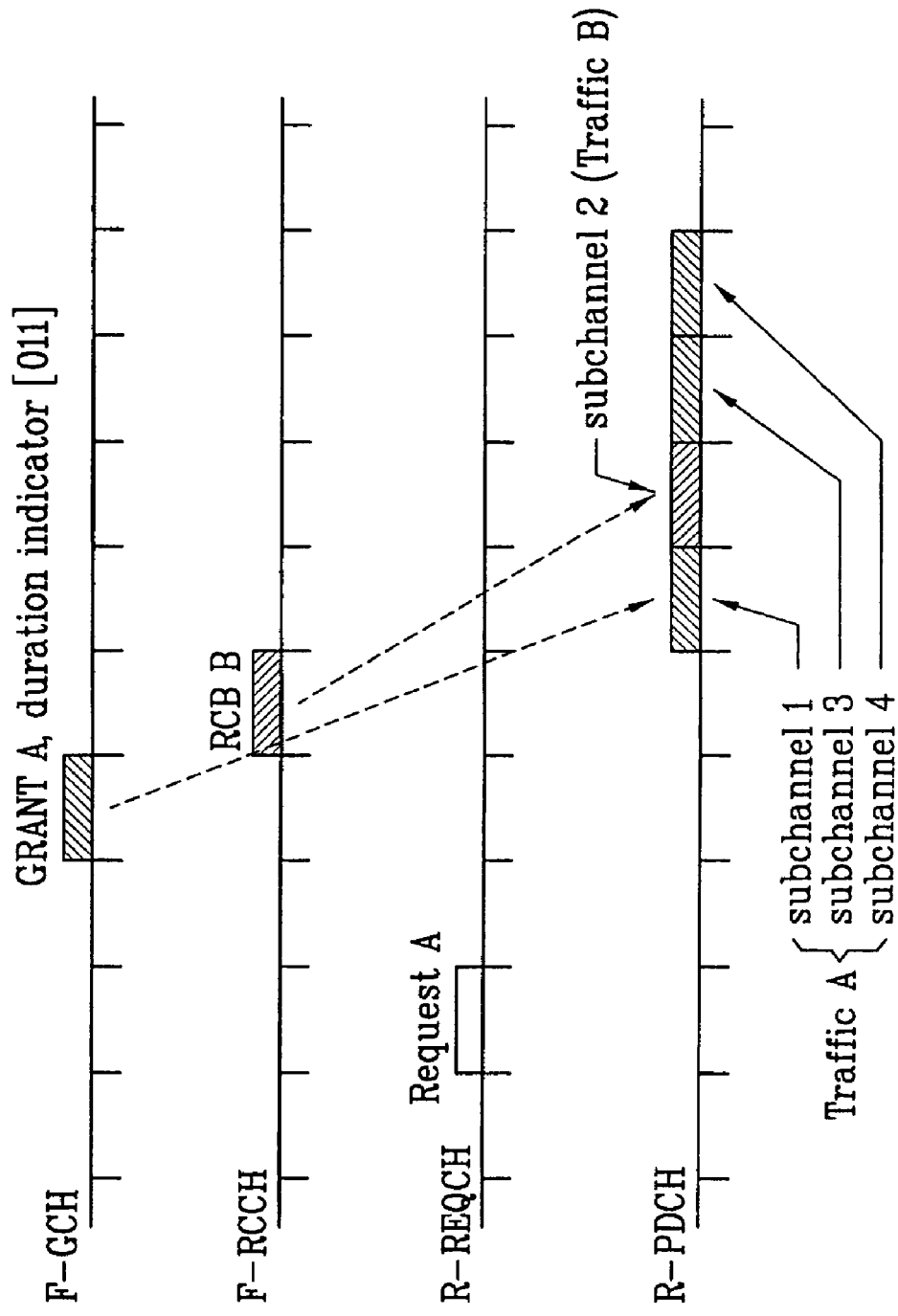

REVERSE LINK DATA RATE CONTROL METHOD IN MOBILE COMMUNICATION SYSTEM

This application claims the benefit of Korean Patent Application No. 10-2003-0060714 filed on Sep. 1, 2003, which is hereby incorporated by reference.

BACKGROUND OF THE INVENTION

1. Field of the Invention

The present invention relates to a radio mobile communication system, and more particularly, to a method of controlling a data rate in transmitting data on reverse link traffic channel in a radio mobile communication system.

2. Discussion of the Related Art

IS-2000 Revision D provides for a mobile communication system enabling packet data transmission to a base station on a reverse-link traffic channel, namely, a reverse packet data channel or R-PDCH, but a mobile station cannot autonomously determine a data transmission rate of a reverse link channel. Serious interference among the mobile stations of a system results should one of the mobile stations be permitted to operate at a data rate much higher than that of others, and the entire system may become unstable. Therefore, reverse link data rates are controlled by a base station, which controls the reverse link data rate of each mobile station by considering a variety of parameters, such as the respective statuses of all the mobile stations and that of a reverse link channel used by the mobile stations, and respectively transmitting to each mobile station information indicative of an appropriate data rate for use by the corresponding mobile station. Thereafter, each mobile station determines its own data rate, based on the information received from the base station, to transmit data on the reverse traffic channel at the determined rate.

The base station may control the reverse link data rate of a specific mobile station by either a general rate control method or a scheduling method. In the general rate control method, a current data rate is set by incrementing or decrementing a previous data rate, thereby enabling control of a reverse link data rate using a relatively few bits of information. In the scheduling method, on the other hand, the base station at all times controls the current reverse link data rate independently, i.e., irrespective of a previous data rate, which requires a great number of information bits. As a preferred method of controlling the data rate of a reverse link channel, the Third Generation Partnership Project 2 (3GPP2) currently adopts a control algorithm, which combines the general rate control method and the scheduling method, assigning a forward grant channel (F-GCH) and a forward rate control channel (F-RCCH) to a specific mobile station via call negotiation with the base station. Here, the mobile station informs the base station of its current status, i.e., its buffer size, its transmission power status, its quality-of-service (QoS) class, and the like, via a reverse-request channel (R-REQCH), so that the base station may transmits a grant message to the mobile station via the F-GCH channel or a rate control bit (RCB) via the F-RCCH channel. Accordingly, the data rate of a reverse-link data transmission, made by a mobile station via the R-PDCH channel, is controlled.

The above methods, i.e., the general rate control method and scheduling method, are explained with reference to FIGS. 1 and 2, respectively. The data transmission rate of a reverse link (traffic) channel, i.e., the R-PDCH channel, is controlled for a specific mobile station by the base station transmitting rate control information in response to the mobile station's status information sent via an R-REQCH channel. The rate control information, transmitted in response to a request from the mobile station, is an RCB transmitted via an F-RCCH channel in FIG. 1 or is a grant message transmitted via an F-GCH channel in FIG. 2. The RCB is essentially a command for a rate hold, a rate increase, or a rate decrease. The grant message includes a maximum traffic-to-pilot (T/P) power ratio for transmission on the R-PDCH channel by a specific mobile station. Here, it should be appreciated that a maximum traffic-to-pilot power ratio is needed for each subchannel of the R-PDCH channel.

Meanwhile, in controlling a reverse link data rate in a mobile communication system supporting hybrid automatic repeat request (HARQ) transmission, for example, a system as provided in IS-2000 Revision D, a transmission delay time is generated when a mobiles station responds to ACK/NACK information from the base station. That is, in the HARQ system, error control is achieved through a retransmission of a data packet in response to a negative acknowledgement (NACK) signal provided on a forward link, i.e., via a forward acknowledgement channel (F-ACKCH). If an acknowledgement (ACK) signal is received, the mobile station transmits a new packet. Thus, the data traffic on the R-PDCH channel is made up of new packets and retransmission packets.

Referring to FIG. 3, illustrating a reverse link data rate control method in a HARQ system, the aforementioned transmission delay can be divided into a plurality K of subchannels for providing homogeneous and heterogeneous services, and each subchannel can be established with an independently set data rate. In the example of FIG. 3, K=4. During call establishment, the base station uses signaling to inform a mobile station of the number of subchannels, e.g., one, two, three, or four, that can be used for packet transmission by the mobile station. Accordingly, if a mobile station occupies four R-PDCH subchannels for transmitting traffic data via a series of four subchannel transmissions, a base station should transmit four grant messages, as shown in FIG. 4, to separately control the data rate of each sub-channel.

Therefore, in the reverse link data rate control method of the related art, the transmission of multiple grant messages, equaling the number of subchannels assigned to a mobile station, is required. Such transmission is required even if transmitting the same information in each message. Hence, the base station must repetitiously transmit data, which consumes transmission power unnecessarily.

SUMMARY OF THE INVENTION

Accordingly, the present invention is directed to a reverse link data rate control method that substantially obviates one or more problems due to limitations and disadvantages of the related art.

An object of the present invention is to provide a method of controlling a reverse link data rate, by which a single grant message is transmitted via an F-GCH channel to control the reverse link data rate of a plurality of R-PDCH subchannels.

Another object of the present invention is to provide a method of controlling a reverse link data rate, by which transmission power is conserved.

Another object of the present invention is to provide a method of controlling a reverse link data rate, enabling an efficient control of the reverse link data rate of a plurality of R-PDCH subchannels.

Another object of the present invention is to provide a method of controlling a reverse link data rate, enabling reduced interference between base stations assigning reverse link traffic channels.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, there is provided a method of controlling reverse link data rate in a mobile communication system supporting HARQ transmission. The method comprises steps of generating rate control information for determining a data rate for transmission by a mobile station via a reverse traffic channel; and transmitting to the mobile station a message including the generated rate control information and subchannel information, the message corresponding to a series of subchannel transmissions to which the determined data rate will be applied.

In another aspect of the present invention, there is provided a method of controlling reverse link data rate in a mobile communication system supporting HARQ transmission. The method comprises steps of receiving a message including rate control information for transmission on a reverse traffic channel and subchannel information, the message corresponding to a series of subchannel transmissions to which the determined data rate will be applied; determining, based in the rate control information, a data rate for the reverse traffic channel; and transmitting reverse link data at the determined data rate via one of the subchannels to which the determined data rate will be applied.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 is a diagram of another example of a reverse link data rate control method according to the second embodiment, using a second duration indicator per Table 4.

DETAILED DESCRIPTION OF THE INVENTION

Figure 1:
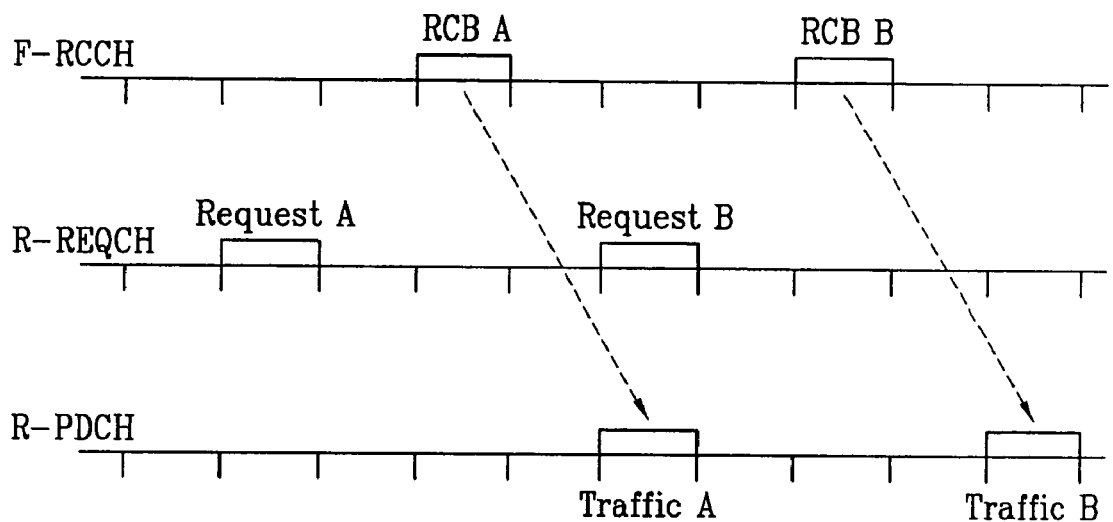
FIG. 1 is a diagram for explaining a general rate control method according to a related art.

Reference will now be made in detail to the preferred embodiments of the present invention, examples of which are illustrated in the accompanying drawings. Wherever possible, the same reference numbers will be used throughout the drawings to refer to the same or like parts.

A mobile station informs a base station of its current status by transmitting, via an R-REQCH channel, information on the mobile station's buffer size, transmission power status, quality-of-service class, and the like. The base station then determines an appropriate data rate for packet data transmission by the mobile station, i.e., the traffic of the R-PDCH channel, based on various available parameters, including the received mobile station status information and the transmission status of the R-PDCH channel itself, and thereby generates rate control information for the active mobile stations of the R-PDCH channel for respective transmission to each mobile station. The rate control information may be included in a grant message transmitted via an F-GCH channel or transmitted as an RCB via an F-RCCH channel. Specifically, the rate control information may be the maximum traffic-to-pilot power ratio information included in a grant message or one of a "rate hold" command, a "rate increase" command, and a "rate decrease" command, i.e., an RCB. A unique set of rate control information is individually applied to each unit of transmission.

In determining a reverse link data rate case by way of the base station transmitting a grant message to a mobile station via an F-GCH channel, the present invention is characterized in transmitting rate control information together with subchannel information to which the rate control information will be applied, to thereby overcome the problems of the related art in which a separate grant message must be generated and transmitted for each sub-channel. Here, the subchannel information is a "duration indicator" contained in a bit field indicative of the constitution of a consecutive series of sub-channel transmissions immediately following that of a first subchannel. The bit field is included in one grant message transmitted for the entire series and may be variously configured, as in one of the following preferred embodiments of the present invention, in which the duration indicator has a predetermined bit length corresponding to the subchannel assignment.

According to a first preferred embodiment, the duration indicator is contained in a one-bit or two-bit field of the grant message. The one-bit field enables application to traffic occupying three subchannels, as shown in Table 1, and the two-bit field enables application to traffic occupying three or four subchannels, as shown in Table 2. These bit fields, however, are merely exemplary, and the method of the present invention in accordance with the first embodiment may be implemented using a duration indicator of other lengths, and one or more such tables according to the present invention may be stored, for example, in the base station.

TABLE 1

| bit field | duration (three subchannel assignment) |
|---|---|
| 0 | 1 frame |
| 1 | 2 frames |

TABLE 2

| bit field | duration (three subchannel assignment) | duration (four subchannel assignment) |
|---|---|---|
| 00 | 0 frames | 0 frames |
| 01 | 1 frame | 1 frame |
| 10 | 2 frames | 2 frames |
| 11 | X | 3 frames |

Figure 2:
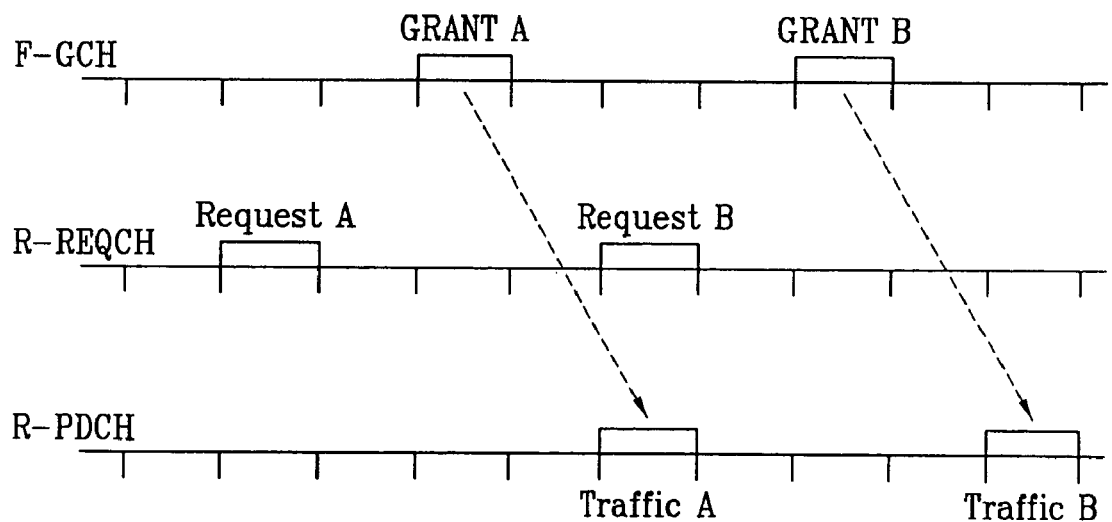
FIG. 2 is a diagram for explaining a reverse link data rate control method by scheduling according to a related art.
Figure 3:
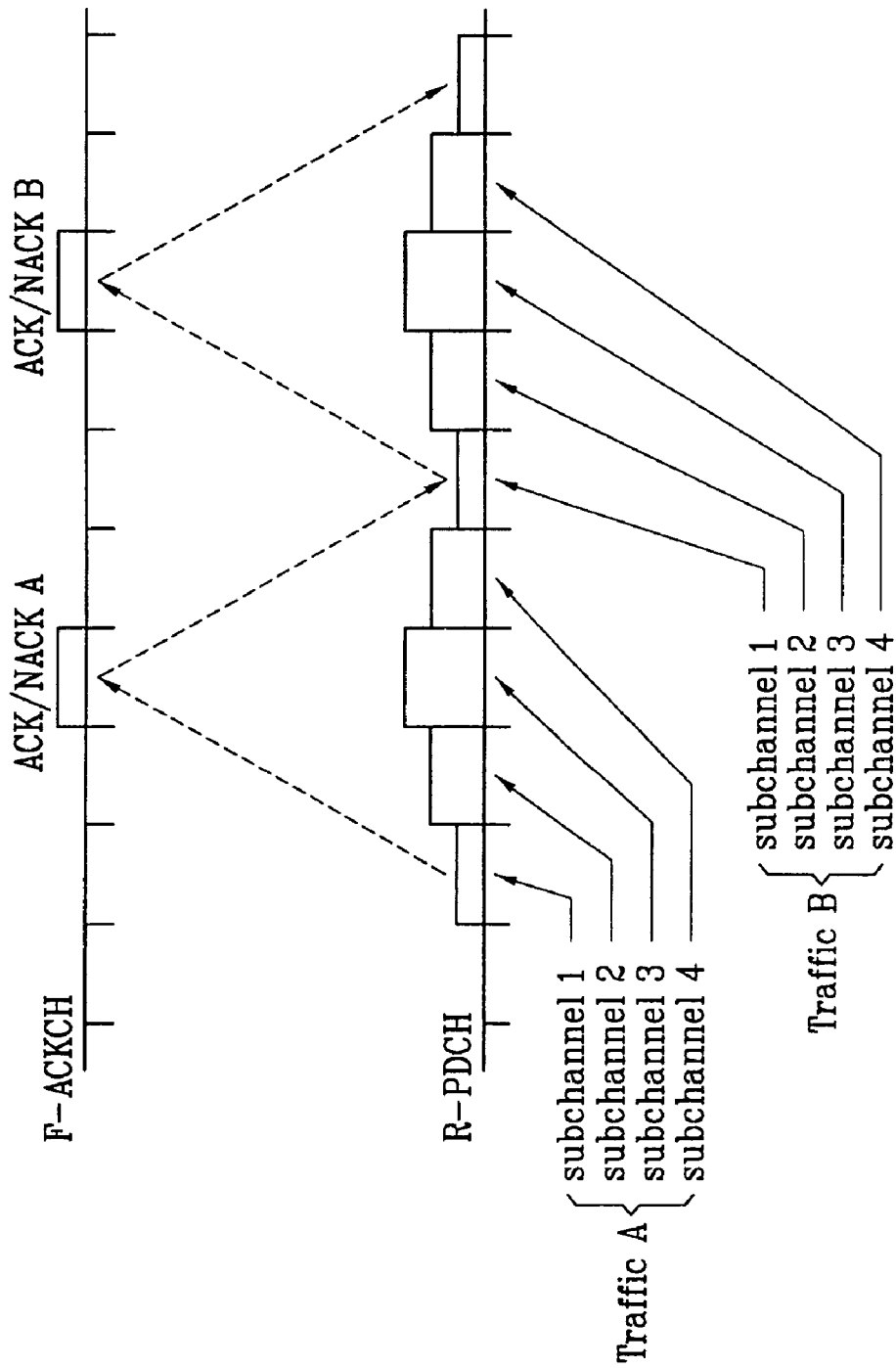
FIG. 3 is a diagram for explaining a reverse link data rate control method in a HARQ system of the related art.
Figure 4:
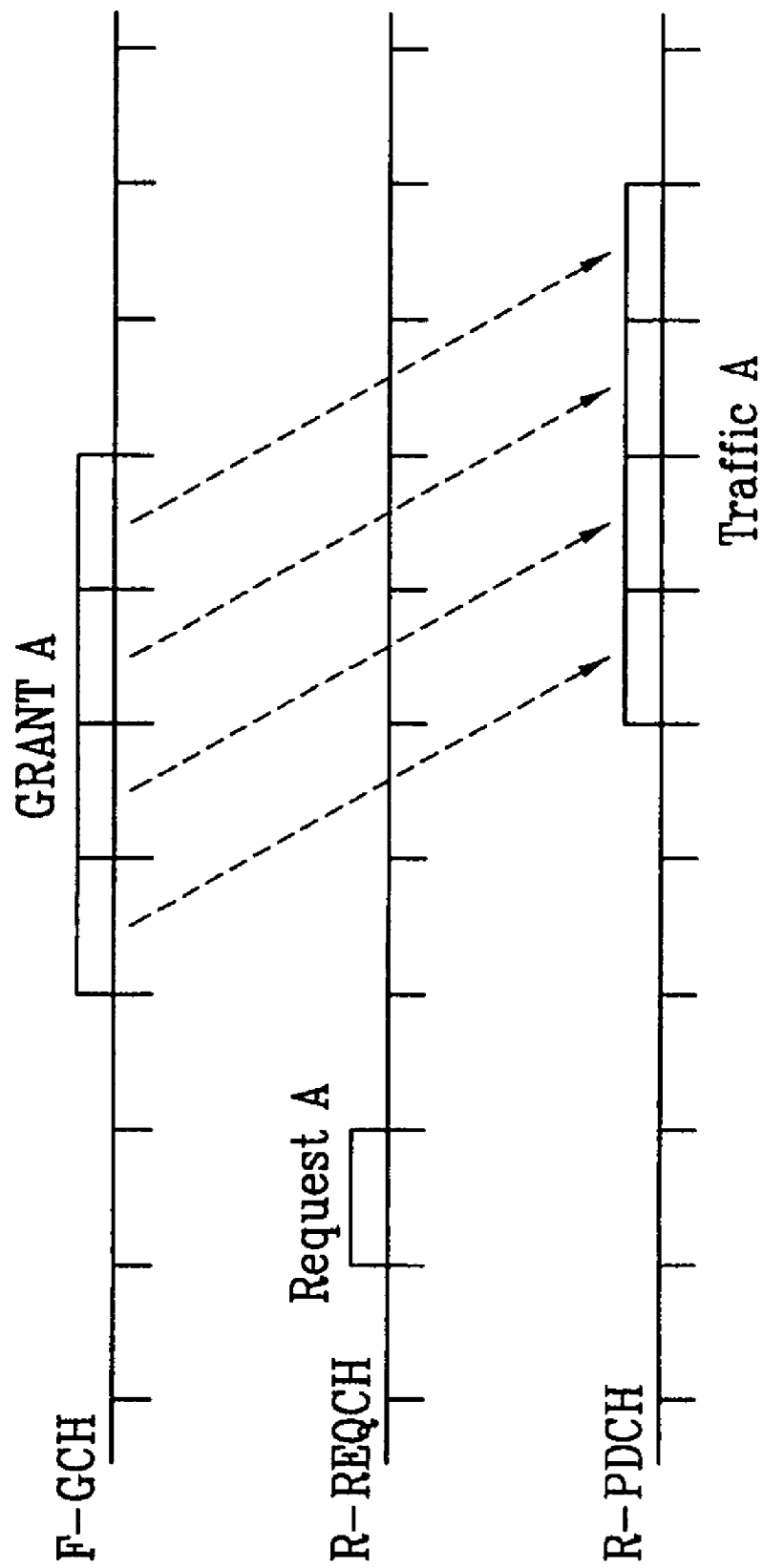
FIG. 4 is a diagram for explaining the grant message transmission in the system of FIG. 3.

Referring to the above tables, each duration indicator (bit field value) indicates a duration expressed in frames, which correspond directly to a unit of subchannel occupation of the R-PDCH channel. Thus, a one-bit field per FIG. 1 enables a set of duration indicators capable of indicating a series of subchannel transmissions of one or two frames in duration, and a two-bit field per FIG. 2 enables a set of duration indicators capable of indicating a series of subchannel transmissions of zero, one, two, or three frames in duration. In Tables 1 and 2, each duration indicator is representative of a contiguous set of frames, i.e., a consecutive series of subchannel transmissions. The value of the duration indicator as shown in the table indicates a number of frames to be included in the series but assumes an inclusion of the first subchannel. In other words, the duration indicator indicates the number of assigned subchannels immediately succeeding the transmission of a first subchannel (the number of subchannels beyond the first subchannel) to which a grant message is to be applied, such that a "0 frames" duration refers to the first subchannel (subchannel 1) only, a "1 frame" duration refers to the first subchannel followed by the next subchannel (subchannel 2), a "2 frames" duration refers to the first subchannel followed by the next two subchannels (subchannels 2 and 3), and a "3 frames" duration refers to the first subchannel followed by the next three subchannels (subchannels 2, 3, and 4). grant message transmitted on an F-GCH channel by a base station assigning a reverse link Accordingly, Table 1 shows a one-bit duration indicator appended to one data rate for three subchannels of an R-PDCH channel. Here, if the duration indicator has a binary value of "0" (bit field=0), the data rate assigned to the first subchannel is also assigned to one additional subchannel, i.e., the subchannel transmitted during the ensuing one-frame period, and if the duration indicator has a binary value of "1" (bit field=0), the data rate assigned to the first subchannel is also assigned to two additional subchannels, i.e., the subchannels transmitted during the ensuing two-frame period.

Figure 5:
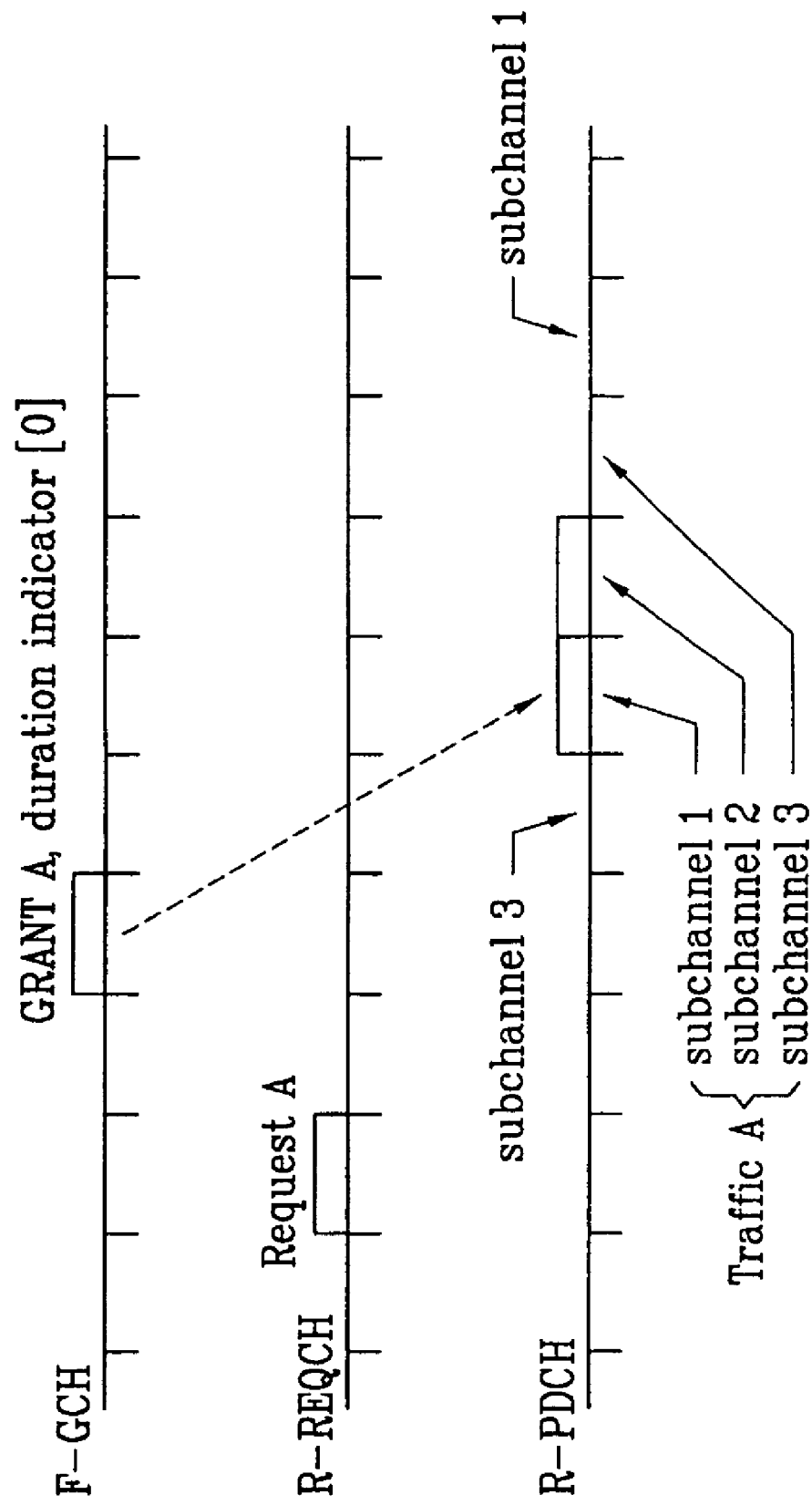
FIG. 5 is a diagram of an example of a reverse link data rate control method according to a first embodiment of the present invention, using a duration indicator per Table 1.

In a reverse link data rate control method according to the first embodiment of the present invention, as shown in FIG. 5, the F-GCH channel carries a grant message (GRANT A) including a duration indicator of Table 1. Specifically, the grant message includes a one-bit field containing a duration indicator [0], indicating a duration of one frame. Thus, the rate control information included in the transmitted grant message is applied to subchannel 1 and applied also to subchannel 2. In this case, there is no transmission for subchannel 3 corresponding to the grant message (GRANT A). For a duration indicator [1], in which a transmission on subchannel 3 is considered, the rate control information of the grant message of the example of FIG. 5 would be applied to the subchannel 1 and applied also to subchannels 2 and 3.

Meanwhile, Table 2 shows a two-bit duration indicator appended to one grant message transmitted on an F-GCH channel by a base station assigning a reverse link data rate for either case of three or four subchannels of an R-PDCH channel. In the case of a three-subchannel assignment, if the duration indicator has a binary value of "00" (bit field=00), the data rate control information is applied to the first subchannel only; if the duration indicator has a binary value of "01" (bit field=01), the data rate assigned to the first subchannel is also assigned to one additional subchannel, i.e., the subchannel transmitted during the ensuing one-frame period; and if the duration indicator has a binary value of "10" (bit field=10), the data rate assigned to the first subchannel is also assigned to two additional subchannels, i.e., the subchannels transmitted during the ensuing two-frame period. Here, a binary value of "11" (bit field=11) is a null field.

Figure 6:
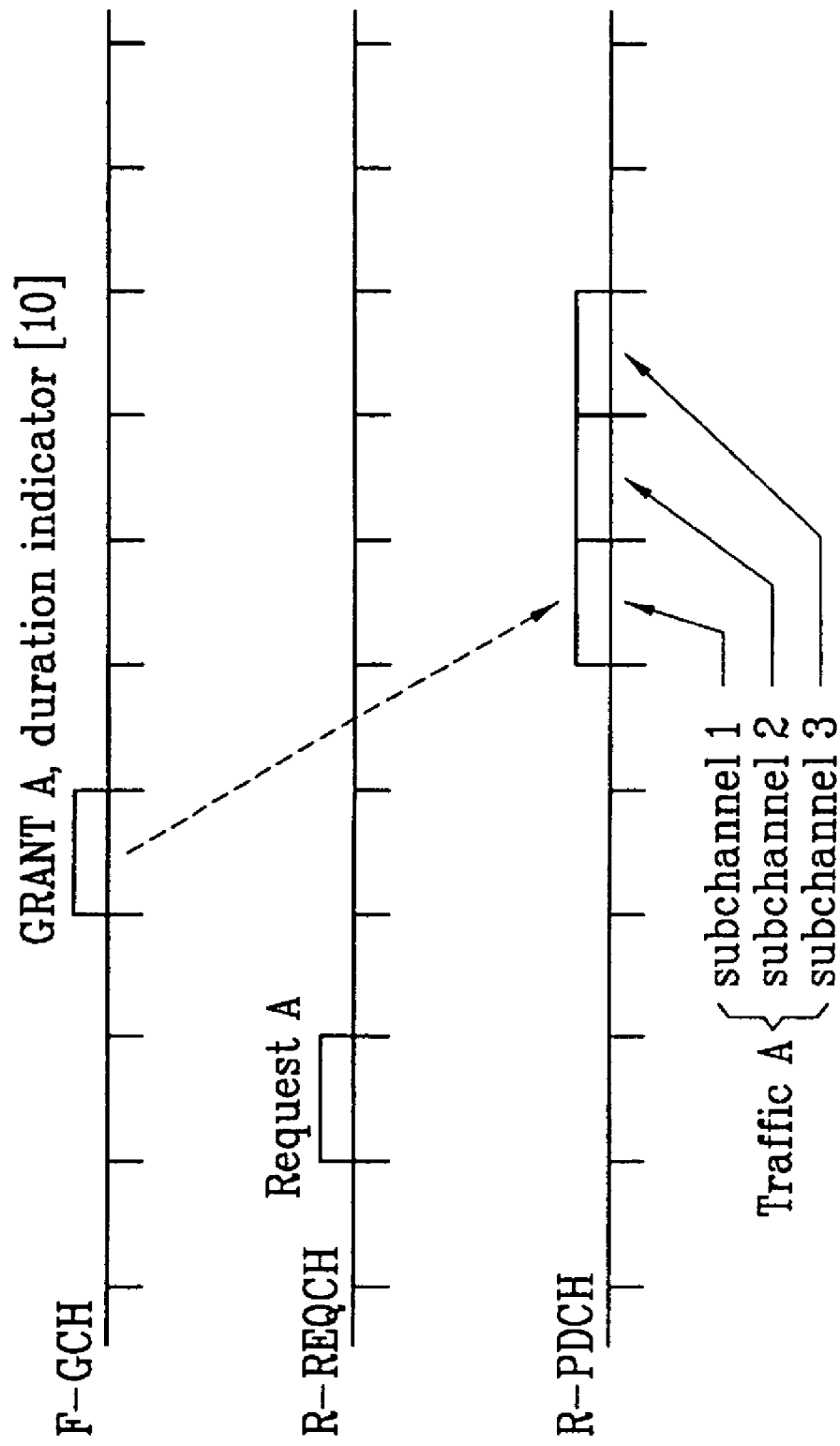
FIG. 6 is a diagram of an example of a reverse link data rate control method according to a first embodiment of the present invention, using a duration indicator per Table 2, in which the reverse link channel includes three subchannels.

Accordingly, in a reverse link data rate control method according to the first embodiment of the present invention, as shown in FIG. 6, the F-GCH channel carries a grant message (GRANT A) including a duration indicator of Table 2. Specifically, the grant message includes a one-bit field containing a duration indicator [10], indicating a duration of two frames. Thus, the rate control information included in the transmitted grant message is applied to subchannel 1 and applied also to subchannels 2 and 3.

On the other hand, in the case of a four-subchannel assignment, if the duration indicator has a binary value of "00" (bit field=00), the data rate control information is applied to the first subchannel only; if the duration indicator has a binary value of "01" (bit field=01), the data rate assigned to the first subchannel is also assigned to one additional subchannel, i.e., the subchannel transmitted during the ensuing one-frame period; if the duration indicator has a binary value of "10" (bit field=10), the data rate assigned to the first subchannel is also assigned to two additional subchannels, i.e., the subchannels transmitted during the ensuing two-frame period; and if the duration indicator has a binary value of "11" (bit field=11), the data rate assigned to the first subchannel is also assigned to three additional subchannels, i.e., the subchannels transmitted during the ensuing three-frame period.

Figure 7:
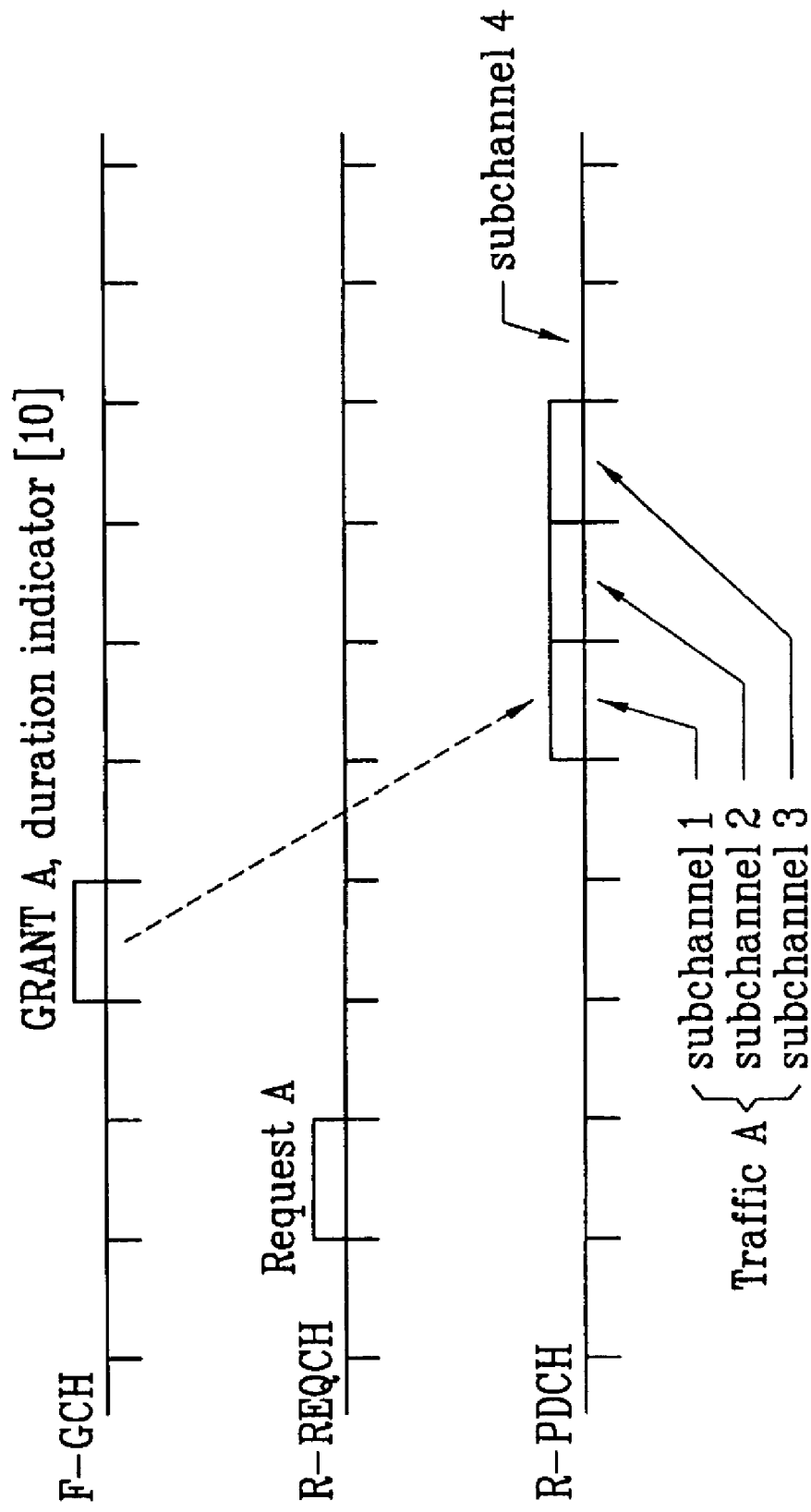
FIG. 7 is a diagram of an example of a reverse link data rate control method according to a first embodiment of the present invention, using a duration indicator per Table 2, in which the reverse link channel includes four subchannels.

Accordingly, in a reverse link data rate control method according to the first embodiment of the present invention, as shown in FIG. 7, the F-GCH channel carries a grant message (GRANT A) including a duration indicator of Table 2. Specifically, the grant message includes a two-bit field containing a duration indicator [10], indicating a duration of two frames. Thus, the rate control information included in the transmitted grant message is applied to subchannel 1 and applied also to subchannels 2 and 3. In this case, there is no transmission for subchannel 4 corresponding to the grant message (GRANT A). For a duration indicator [11], in which a transmission on subchannel 4 is considered, the rate control information of the grant message of the example of FIG. 7 would be applied to the subchannel 1 and applied also to subchannels 2, 3 and 4.

According to the first embodiment of the present invention, since subchannel information, i.e., a duration indicator, is included in a grant message transmitted to indicate the number of identically assigned subchannels beyond the first subchannel, the reverse link data rate of a previously assigned subchannel, for example, by a grant message transmitted via the F-GCH channel of an RCB transmitted via an R-RCCH, can be ignored. In doing so, a new data rate is applied according to a new duration indicator.

According to a second preferred embodiment, the duration indicator is contained in a two-bit or three-bit field of the grant message. The two-bit field enables application to traffic occupying three subchannels, as shown in Table 3, and the three-bit field enables application to traffic occupying four subchannels, as shown in Table 4. These bit fields, however, are merely exemplary, and the method of the present invention in accordance with the second embodiment may be implemented using a duration indicator of other lengths, and one or more such tables according to the present invention may be stored, for example, in the base station.

TABLE 3

| bit field | rate assignment (subchannel 2, frame + 1) | rate assignment (subchannel 3, frame + 2) |
|---|---|---|
| 00 | not applied | not applied |
| 01 | not applied | applied |
| 10 | applied | not applied |
| 11 | applied | applied |

TABLE 4

| bit field | rate assignment (subchannel 2, frame + 1) | rate assignment (subchannel 3, frame + 2) | rate assignment (subchannel 4, frame + 3) |
|---|---|---|---|
| 000 | not applied | not applied | not applied |
| 001 | not applied | not applied | applied |
| 010 | not applied | applied | not applied |
| 011 | not applied | applied | applied |
| 100 | applied | not applied | not applied |
| 101 | applied | not applied | applied |
| 110 | applied | applied | not applied |
| 111 | applied | applied | applied |

Referring to the above tables, each duration indicator (bit field value) indicates a rate assignment per frame (subchannel) subsequent to the first. That is, the respective binary values for each bit of the bit field according to bit significance (place value) indicate, in Table 3, whether the data rate control information corresponding to the first subchannel is to be also applied to the second subchannel at a frame+1 and/or to the third subchannel at a frame+2 or indicate, in Table 4, whether the data rate control information corresponding to the first subchannel is to be also applied to the second subchannel at a frame+1, to the third subchannel at a frame+2, and/or to the fourth subchannel at a frame+3. Thus, if the binary value of any digit is a first value, the grant message is applicable to the corresponding subchannel, and if the binary value of any digit is a second value, the grant message is inapplicable to the corresponding subchannel. In the example of Tables 3 and 4, the first and second values are "1" and "0," respectively.

Figure 8:
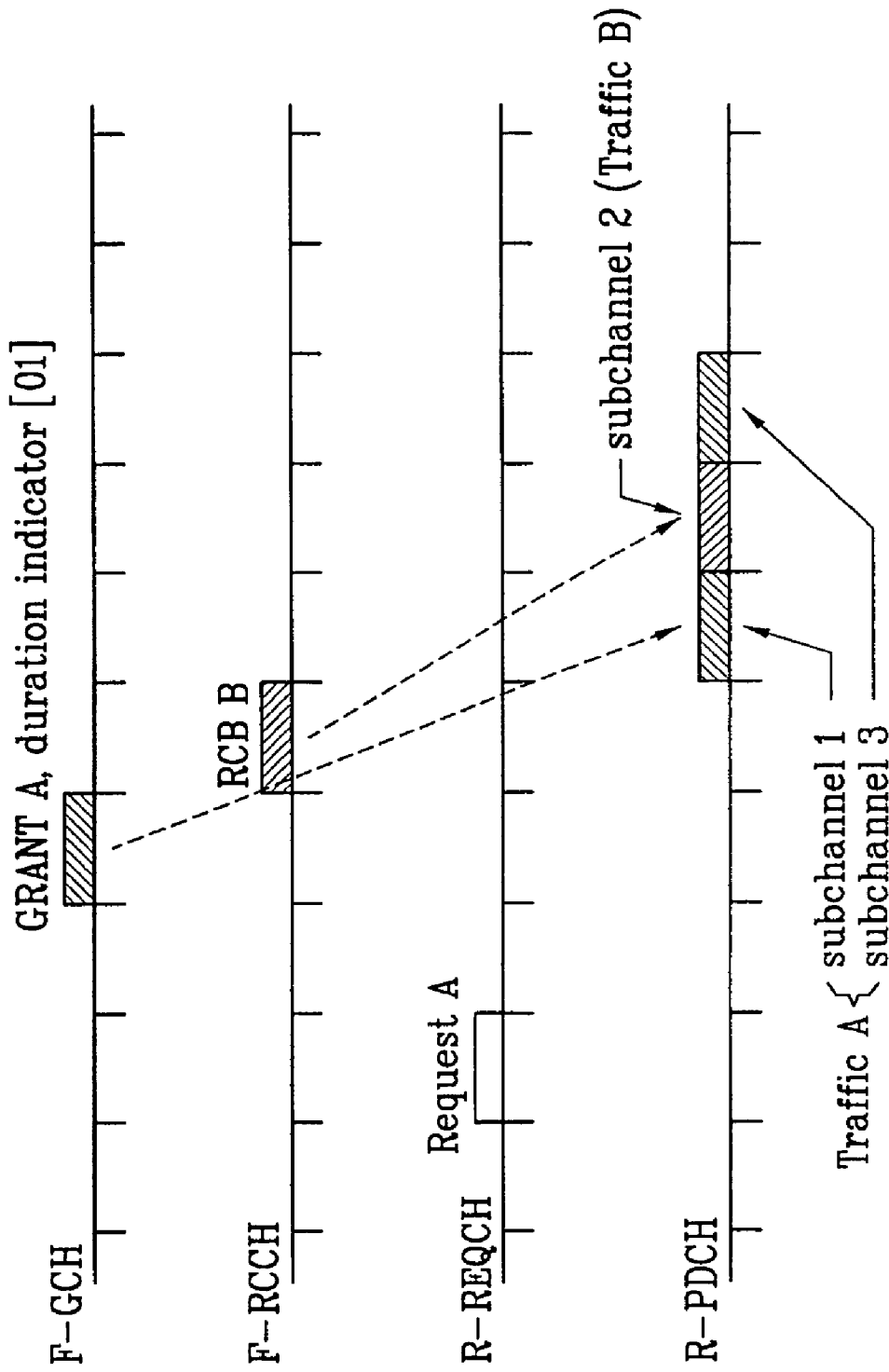
FIG. 8 is a diagram of an example of a reverse link data rate control method according to a second embodiment of the present invention, using a duration indicator per Table 3.

Accordingly, in a reverse link data rate control method according to the second embodiment of the present invention, as shown in FIG. 8, the F-GCH channel carries a grant message (GRANT A) including a duration indicator of Table 3. Specifically, the grant message includes a two-bit field containing a duration indicator [01], indicating a rate assignment in accordance with a most significant bit (MSB) value of "0" and a least significant bit (LSB) value of "1," such that the rate control information included in the transmitted grant message and applied to subchannel 1 and is also applied to subchannel 3 at the frame+2 position. Here, the data rate of subchannel 2 at the frame+1 position is assigned in accordance with rate control information (RCB B) transmitted via an R-RCCH channel. If the grant message of the example of FIG. 8 were to instead include a duration indicator [11], the data rate of the subchannel 2 would simply be determined based on the most recently transmitted rate control information, namely, either the grant message or the RCB.

Figure 9:
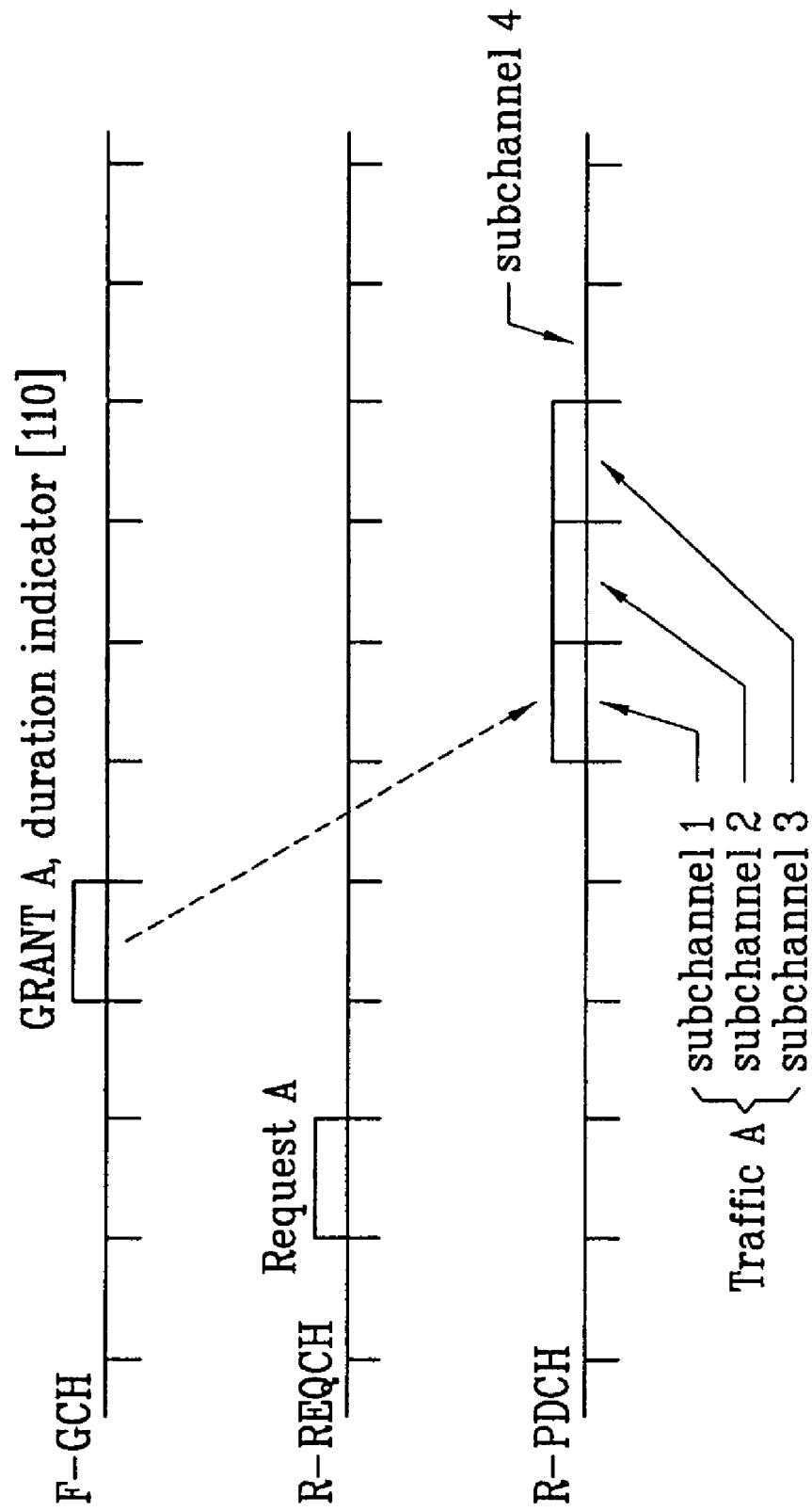
FIG. 9 is a diagram of an example of a reverse link data rate control method according to a second embodiment of the present invention, using a first duration indicator per Table 4.

Meanwhile, in a reverse link data rate control method according to the second embodiment of the present invention, as shown in FIG. 9, the F-GCH channel carries a grant message (GRANT A) including a duration indicator of Table 4. Specifically, the grant message includes a three-bit field containing a duration indicator [110], indicating a rate assignment in accordance with a most significant bit value of "1," a second most significant bit value of "1," and a least significant bit value of "0," such that the rate control information included in the transmitted grant message and applied to subchannel 1 and is also applied to subchannel 2 at the frame+1 position and to subchannel 3 at the frame+2 position. In this case, there is no transmission for subchannel 4 corresponding to the grant message (GRANT A).

Another example of the application of Table 4 is shown in FIG. 10, in which the grant message includes a three-bit field containing a duration indicator [011], indicating a rate assignment in accordance with a most significant bit value of "0," a second most significant bit value of "1," and a least significant bit value of "1," such that the rate control information included in the transmitted grant message and applied to subchannel 1 and is also applied to subchannel 3 at the frame+2 position and to subchannel 4 at the frame+3 position. Here, since the data rate of subchannel 2 at the frame+1 position is controlled via an RCB transmitted on the F-RCCH channel, the duration indicator of the grant message excludes application of the assigned rate to subchannel 2, which is transmitted according to the rate control information of RCB B.

In accordance with a preferred embodiment of the present invention, the grant message may further include a duration indicator flag, to be transmitted by the base station together with a duration indicator as in any of the above tables. The duration indicator flag of the present invention occupies a one-bit field and indicates the applicability of a specific duration indicator for assigning a data rate to the various subchannels. Thus, a duration indicator flag having a first value (e.g., "1") may indicate an "applicable" state of the duration indicator, whereby the duration indicator is applied as described above for a specific series of subchannel transmissions. On the other hand, a duration indicator flag having a second value (e.g., "0") may indicate an "inapplicable" state of the duration indicator, whereby the data rate of the corresponding series of subchannel transmissions is determined without regard to the duration indicator transmitted with the duration indicator flag. In other words, the duration indicator flag essentially indicates whether the mobile station is to follow the subchannel information as received.

Having received a single grant message via an F-GCH channel, the transmitted grant message including a duration indicator (subchannel information) together with rate control information for determining the reverse link data rate transmittable on a reverse traffic channel, a mobile station determines its reverse link data rate accordingly and transmits reverse traffic at an appropriate data rate determined for each of a plurality of subchannels, by assigning to subsequent subchannels the data rate of the first subchannel to which the reverse link data rate is applicable. Accordingly, the present invention uses a single grant message to assign a reverse link data rate to various subchannels used by a mobile station, to thereby reduce the power consumption of a base station when transmitting traffic data. Moreover, the base station transmits less in assigning reverse link traffic channels, interference between base stations can be minimized.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of controlling reverse link data rate in a mobile communication system supporting hybrid automatic retransmission request (HARQ) transmission, the method comprising:
  generating rate control information to be used for a mobile station to determine a data rate for transmission via a reverse traffic channel; and
  transmitting to the mobile station a message including the generated rate control information and subchannel information, the subchannel information including a duration indicator which indicates a number of subchannels on the reverse traffic channel to which the generated rate control information is applicable, wherein the generated rate control information is to be applied to a plurality of subchannels.

2. The method of claim 1, wherein the subchannel information comprises a predetermined number of bits of varying place value, each place value indicative of an applicability of the generated rate control information to a subchannel corresponding to the place value.

3. The method of claim 1, wherein the message further includes a flag indicating whether the mobile station is to follow the subchannel information.

4. The method of claim 1, wherein the reverse traffic channel is a reverse packet data channel.

5. The method of claim 1, wherein the message is transmitted via a forward grant channel.

6. The method of claim 5, wherein the message is a grant message.

7. The method of claim 1, wherein the rate control information is a maximum traffic-to-pilot power ratio.

8. A method of controlling reverse link data rate in a mobile communication system supporting hybrid automatic retransmission request (HARQ) transmission, the method comprising:
  receiving a message including rate control information for transmission on a reverse traffic channel and subchannel information, subchannel information including a duration indicator which indicates a number of subchannels on the reverse traffic channel to which the generated rate control information is applicable, wherein the generated rate control information is to be applied to a plurality of subchannels;
  determining, based on the rate control information, a data rate for the plurality of subchannels on the reverse traffic channel; and
  transmitting reverse link data at the determined data rate via one of the plurality of subchannels.

9. The method of claim 8, wherein the subchannel information comprises a predetermined number of bits of varying place value, each place value indicative of an applicability of the rate control information to a subchannel corresponding to the place value.

10. The method of claim 8, wherein the message further includes a flag indicating whether the mobile station is to follow the subchannel information.

11. The method of claim 8, wherein the reverse traffic channel is a reverse packet data channel.

12. The method of claim 8, wherein the message is received via a forward grant channel.

13. The method of claim 12, wherein the message is a grant message.

14. The method of claim 8, wherein the rate control information is a maximum traffic-to-pilot power ratio.

* * * * *